United States Patent [19]
Fort et al.

[11] 3,747,405
[45] July 24, 1973

[54] MAPPING HYDROCARBON SEEPAGES IN WATER-COVERED REGIONS

[75] Inventors: Eldon R. Fort; Basil O. Prescott; Arley Walters, all of Houston, Tex.

[73] Assignee: Shell Oil Company, New York, N.Y.

[22] Filed: Feb. 3, 1971

[21] Appl. No.: 112,476

Related U.S. Application Data

[63] Continuation-in-part of Ser. No. 835,166, June 20, 1969, abandoned.

[52] U.S. Cl............................................. 73/170 A
[51] Int. Cl............................................ G01p 13/00
[58] Field of Search .................................. 73/170 A

[56] References Cited
UNITED STATES PATENTS

| | | |
|---|---|---|
| 3,069,905 | 12/1962 | Erdely................................ 73/170 A |
| 3,119,092 | 1/1964 | Edgerton .......................... 73/170 A |
| 3,262,090 | 7/1966 | Farmer .............................. 73/170 A |
| 3,561,546 | 2/1971 | Craig ...................................... 175/5 |
| 3,439,537 | 4/1969 | Pullos ................................ 73/170 A |
| 3,447,124 | 5/1969 | Louviere et al.................... 73/170 A |

Primary Examiner—Richard C. Queisser
Assistant Examiner—Arthur E. Korkosz
Attorney—H. W. Coryell and Harold L. Denkler

[57] ABSTRACT

In exploring a water-covered region, a water sampling vehicle is moved through known areal locations within a measured relatively short distance from the bottom of the body of water. Water is pumped from the sampling vehicle to an analyzing system and measurements are made of the areal locations, distances above bottom, and concentrations of at least one hydrocarbon in the water encountered by the sampling vehicle.

6 Claims, 7 Drawing Figures

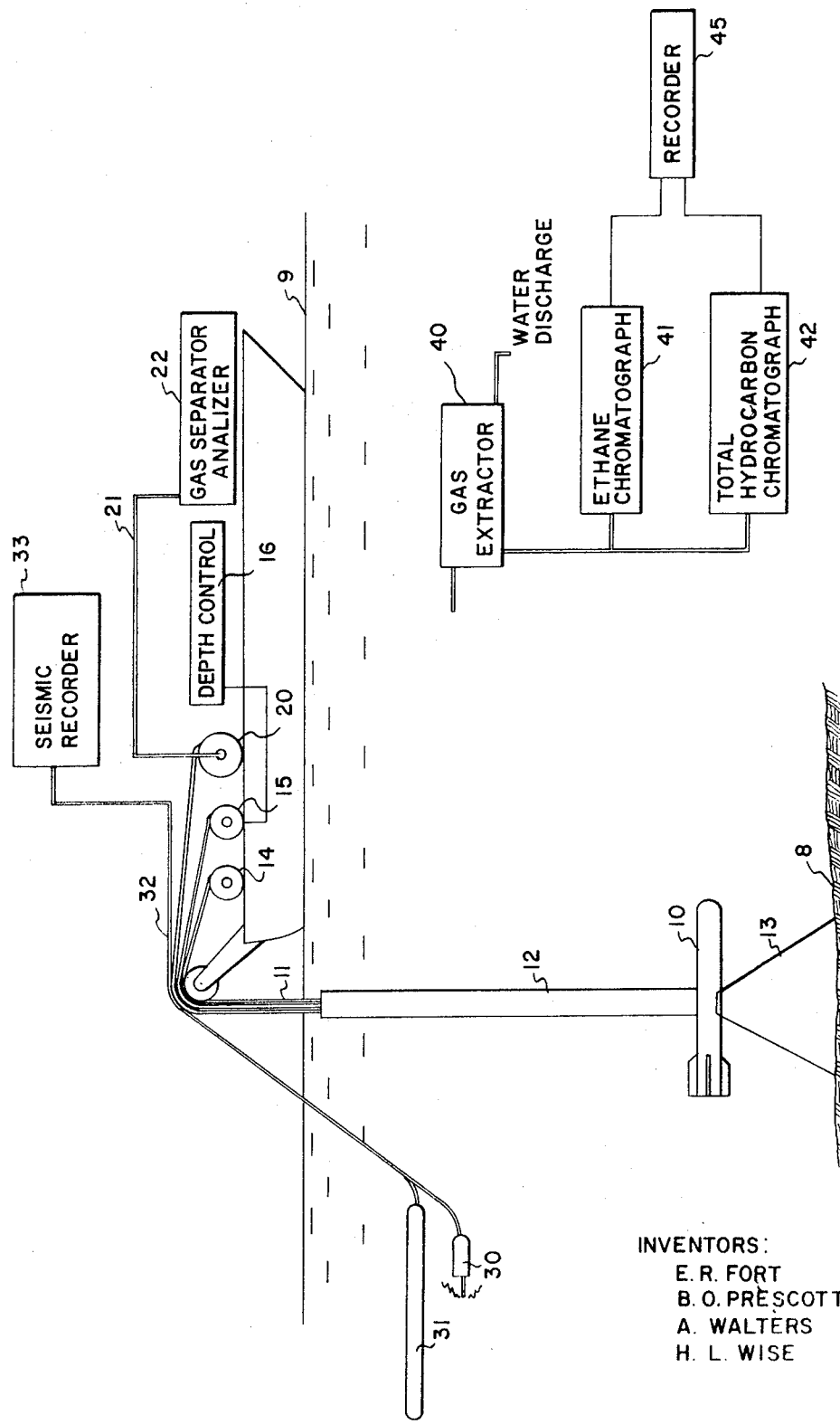

INVENTORS:
E. R. FORT
B. O. PRESCOTT
A. WALTERS
H. L. WISE

INVENTORS:
E. R. FORT
B. O. PRESCOTT
A. WALTERS
H. L. WISE

MAPPING HYDROCARBON SEEPAGES IN WATER-COVERED REGIONS

CROSS-REFERENCE TO THE RELATED PATENT APPLICATION

The present application is a continuation-in-part of application, Ser. No. 835,166, filed June 20, 1969, now abandoned.

BACKGROUND OF THE INVENTION

This invention relates to a process for exploring a water-covered region to provide a map of concentration with areal location of hydrocarbons that seep into the water from subterranean deposits.

Prior methods and apparatus for providing such maps are described in patents, such as U.S. Pat. Nos. 2,918,579 and 3,455,144. Such prior processes are particularly directed to locating areas in which gas is seeping into the water at rates and pressures causing it to bubble up through the water and become dispersed, from a point above the point of seepage, along the direction of the prevailing current. Such processes are conducted by moving a survey vessel along the water, sampling the water contacted near the bottom of the vessel, and measuring the concentration with areal location of at least one hydrocarbon.

SUMMARY OF THE INVENTION

In accordance with this invention, a survey vessel is moved into a series of areal locations within a body of water. A sampling vehicle is towed at measured distances behind the survey vessel at measured distances above the bottom of the body of water while its depth is adjusted as required to keep it generally within a selected relatively short distance above the bottom. Water encountered by the sampling vehicle is pumped to the survey vessel at a substantially constant rate and is periodically analyzed. Measurements are made of the areal location, distance above bottom, and concentration of at least one hydrocarbon, with respect to each of a series of samples of the water encountered by the sampling vehicle.

The term "measuring" is used herein to refer to substantially any means of ascertaining the extent, degree, etc. of quantities, such as areal locations, distances, rates, concentrations, etc. by means of measuring devices, standards, determinations, or the like.

The present invention is at least in part premised on a discovery that in numerous water-covered locations the pressure, temperature, and composition of the water and the hydrocarbons, and the rate of the hydrocarbon seepage are such that the hydrocarbons enter the water as an aqueous solution, or soon become an aqueous solution within the water. In such locations substantially no gas bubbles up through the water. In such locations the hydrocarbons may remain near the bottom and may never be detected by processes such as the previously proposed processes described above.

In operating the present invention, the sampling vehicle or "fish" is kept generally within a selected relatively short distance from the bottom. This keeps it in positions in which the hydrocarbon content of the water is substantially maximum. Further, the hydrocarbon content of the water resulting from sources of contamination such as hydrocarbon producing wells in the area being surveyed is generally restricted to the upper portions of the water. Thus, if the fish is maintained within a selected distance from the bottom of the water-covered area, the results obtained will be more closely related to hydrocarbon seeps from subterranean formations and will be less affected by contamination from producing facilities.

Various means can be used for maintaining the fish within a selected distance from th bottom. Depth sounding equipment which is directed to project substantially downward can be used to measure the distance between the fish and the bottom. The signals from the depth sounding transducer may be transmitted to the surveying vessel so that the depth of the fish may be controlled from that vessel. While an attempt is made to maintain the fish a fixed distance from the bottom of the body of water, the actual distance of the fish from the bottom is also recorded along with the data from the analysis of entrained gases. The record of the distance between the fish and the bottom provides information on the adequacy and/or validity of the sampling with respect to seeps from subterranean formations.

The records provided by surveying a water-covered region in accordance with this invention can be stored in the form of digital or analog electrical or visible representations. For a given region, a selection is made of a distance range from the bottom within which the measurements are apt to be accurately indicative of the amounts of hydrocarbon that seep into the water from subterranean locations. In general, the concentration of hydrocarbons that seep into a body of water tends to be much greater and the water currents tend to be much slower near the bottom of the body of water. The records preferably include (a) the areal locations of hydrocarbon measurements, (b) the distance above the bottom of the water of the hydrocarbon measurements, and (c) the variation with areal location in the measured concentrations of at least one hydrocarbon higher than methane. These records, in the light of the selection of a range of distances above the bottom within which the hydrocarbon content measurements are indicative of seepages, provide a map of areas in which seep-indicative measurements have been obtained and areas in which the hydrocarbon measurements may not be representative of seepages from subterranean earth formations.

BRIEF DESCRIPTION OF THE DRAWINGS

The present invention will be more easily understood from the following detailed description when taken in conjunction with the following drawings in which:

FIG. 1 is a schematic view of a survey vessel and equipment;

FIG. 2 is a block diagram of an analysis system;

Figure 3:
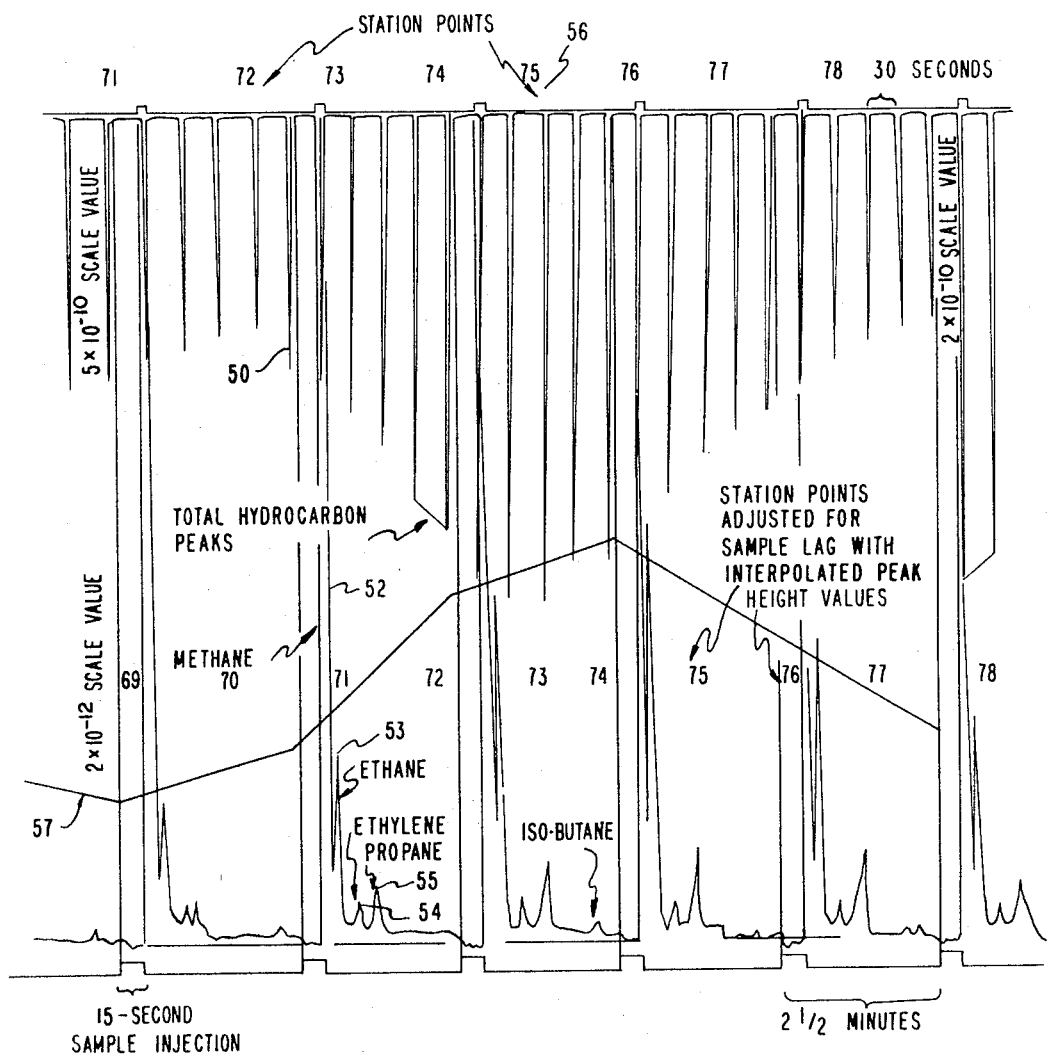
FIG. 3 is a portion of a chart record showing the recording of the total hydrocarbon content as well as the detailed recording of the ethane; ethylene and propane in the gas sample with relation to the position at which the samples were taken.

In a preferred embodiment, the present invention utilizes measurements made at fixed time intervals on water pumped from the fish at a constant rate as the survey vessel moves along a line of survey at a constant speed. Thus, the analysis of each sample can be related to the areal position at which the sample was taken, providing of course the survey vessel remains on the line of survey and maintains a constant speed. Also, the method of the invention requires that the samples be obtained from measured substantially constant short distances above the bottom of the water-covered area, to eliminate inaccuracies that are caused by contamination and variations in water currents. A survey of subterranean structural features, such as a conventional seismic survey, is also made of the area simultaneously with the hydrocarbon survey in order that the two surveys may be correlated to identify subsurface structures that are likely to contain petroleum deposits.

Referring to FIG. 1, there is shown a schematic arrangement of the survey vessel. More particularly, there is shown a fish 10 suspended below the surface of the body of water 9 and located a fixed distance above the bottom 8 of the body of water. The fish in turn is coupled to the survey vessel by means of a composite cable 11 that includes both a stress member for supporting the fish as well as electrical circuits and pipes. The electrical circuits supply power to the fish and transmit signals from the fish, while the pipes convey the water samples from the fish to the survey vessel. The cable 11 is provided with a fairing means 12 which may take various forms, such as those disclosed in U.S. Pat. Nos. 3,241,513 or 3,233,571. In one preferred embodiment, the fish 10 is regatively buoyant and tends to remain suspended substantially vertically from the survey vessel in order that its depth may be readily controlled with respect to the bottom 8. In another embodiment, a fish having a substantially neutral buoyancy is suspended on a relatively long cable which may have little or no fairing and is equipped with means for adjusting fins or hydroplanes in order to move the path of the fish up or down while it is being towed in response to measurements of the distance between it and the bottom of th body of water.

The fish 10 is provided with a sampling means for taking a sample of the water as the fish is towed through the water by the survey vessel. The sampling means should include a pump that delivers a substantially constant flow of water to the survey vessel, for example, a pump that delivers 10 gals./minute. The pumping of water encountered by the sampling vehicle to the survey vessel at a measured and substantially constant rate is preferably accomplished by positively displacing water encountered by the vehicle into an interconnecting fluid conduit having a substantially fixed volume and displacing the water from the vehicle to the vessel at a substantially constant rate. This is preferably accomplished by electrically driving a motor to operate a positive displacement pump, such as a Moyno pump, at a substantially constant rate to displace water into a flexible-walled conduit having a relatively constant volume, such as a flexible hose.

The fish 10 preferably also contains various instruments, as for example, instruments for measuring properties such as the temperature, salinity, and the like, of the water and transmitting signals related thereto to the survey vessel. It may also be desirable to provide means for measuring both the rate of travel of fish 10 relative to the bottom and the amount of relative water flow across and along its line of travel, to provide information from which determinations can be made of the direction and rate of flow of currents in the water. The fish 10 is preferably provided with a focused type of depth sounder 18 for measuring the distance between the fish and the bottom 8. A suitable focused depth sounder is described in U.S. Pat. No. 3,353,149, although substantially any such device can be used. The signals from the depth sounder are transmitted to the surface where they can be used to control the distance between the fish and the survey vessel and/or the tilt of fins on the fish and thus the position of the fish with relation to the bottom 8. It may also be desirable to provide means for measuring the pressure of the water encountered by fish 10. Such pressure measurements are related to the depth of the fish below the surface of the water.

The cable 11 passes over a suitable support sheave or roller at the rear of the survey vessel, the stress memer being coupled to a winch unit 14. The winch unit 14 should be adapted to take in or pay out the cable in order to maintain the desired depth of the fish 10. Of course, it is also necessary to include suitable storage means for the fairing means 12 so that fairing means can be installed on the cable as it is paid out or taken in. In regions in which the water is relatively deep and/or the bottom topography is relatively variable, the use of means for rapidly adding and removing fairings is important. Such a system is needed to keep the fish 10 substantially vertically below the vessel and within a known distance from the bottom 8. Such a system is described in greater detail in U.S. Pat. No. 3,461,830. The signal conductors that carry the signals from the depth sounder are stored on a winch 15 that is provided with slip rings for removing the various signals including the depth sounder signal that is supplied to the depth control 16. Of course, the depth control 16 is coupled to the control system of the winch 14 in order that the depth of the fish may be accurately controlled. The conduit 21, which conveys the water samples is stored on a winch drum 20 with the drum being coupled by means of a pipe 21 to a gas separator and analyzing unit 22. The separator may take various designs such as those shown in U.S. Pat. No. 3,116,133. An important requirement of the gas separator is that it separates the gases that are dissolved in the water sample and supply a substantially dry gas sample to the analyzer unit shown in FIG. 2 and described below.

The survey boat preferably also includes the seismic surveying system which is shown as being a spark unit 30 and a string of geophones 31. The spark unit and geophones are connected to a suitable seismic recorder system 33 by means of a cable 32. Various types of commercially available seismic survey systems of the spark type may be used. Also, it is possible to use other types of surveying systems, such as those employing an exploding gas as a source of seismic energy or pneumatic pistons or guns. The information from the seismic survey is recorded in correlation with the recording of the analysis of the gas in order to provide a record of the geological structures that is easily correlated with the hydrocarbon survey.

Referring now to FIG. 2, there is shown a gas extraction means 40 which supplies a constant stream of dry gas to the analyzing units. The analyzing units comprise a first chromatograph 41 having an unpacked column that will pass all of the hydrocarbons and a second chromatograph 42 having a column that is packed with a silica gel to separate the hydrocarbons into components such as those ranging from methane through the pentanes. Higher hydrocarbons may be present and the sampling interval may be lengthened to record them. The colums of chromatographs 41 and 42 are coupled to the flame-ionization detectors which measure the amount of hydrocarbons being discharged by the columns. The signals from the flame-ionization detectors are recorded on a recorder 45 with the speed of the recorder drive being synchronized with the seismic recorder 33. The position of the survey vessel is also recorded on the record of the recorder 45. Not shown in FIG. 2 are the suitable valves and controls that supply samples of the dry gas to the chromatograph columns at selected intervals. For example, excellent results are obtained when a measurement of the total hydrocarbon content is made every 30 seconds and an analysis of gas is made within periods such as every one and one-quarter minutes.

A portion of an actual chromatograph record is shown in FIG. 3 wherein the total hydrocarbon content is shown at the top and detailed analysis at the bottom. More particularly, the peaks 50 represent the total hydrocarbon content of the gas samples at 30-second intervals, while the peaks such as 52 through 55 represent the detailed analysis of the samples at two and one-half minute intervals. For example, the peaks, 52, 53, 54 and 55 represent the methane, ethane, ethylene and propane peaks, respectively, of one gas sample. At the top of record the navigation reference or fixes are recorded at 56. More particularly, the fixes may be electronic navigation stations, as for example, the stations from a system known as Radist. The line 57 is a plot of interpreted ethane concentrations.

Figure 4:
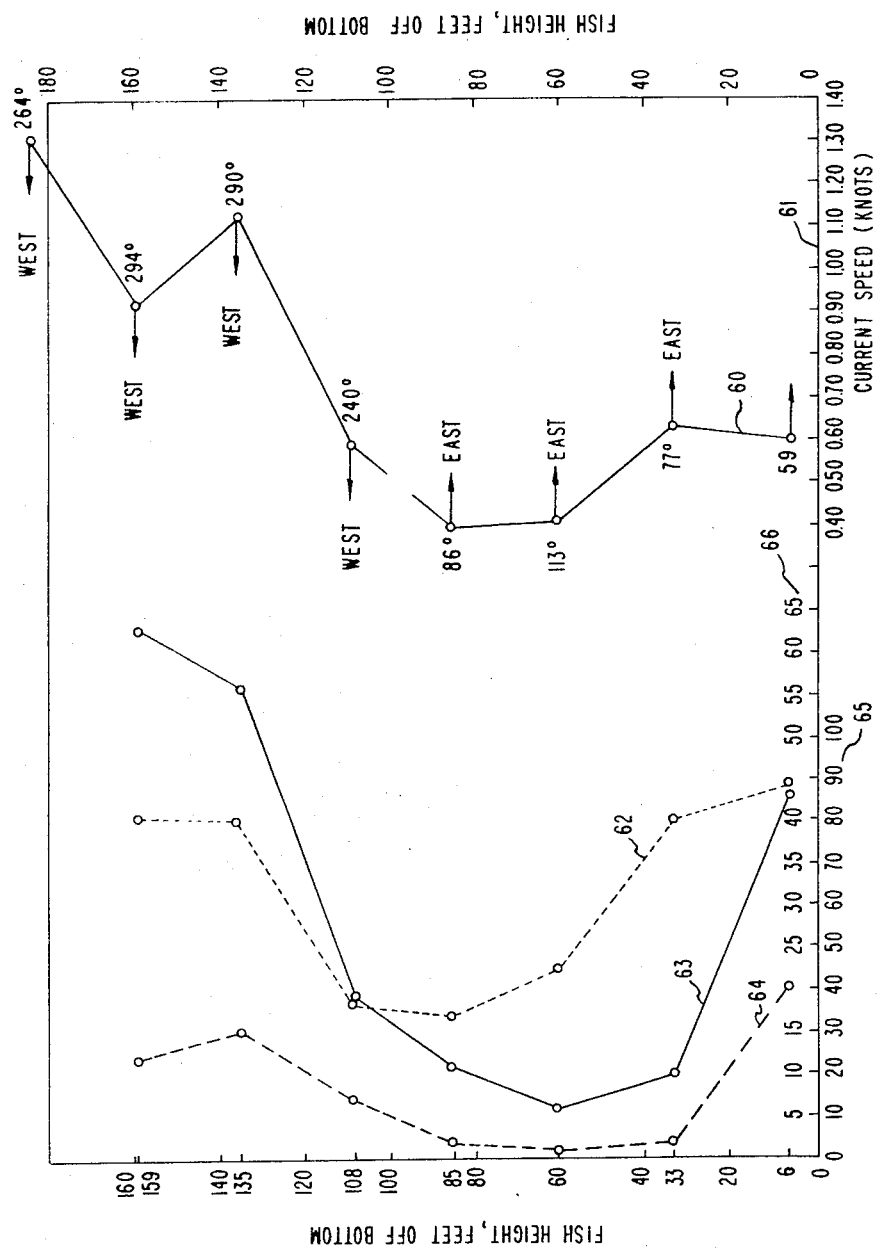
FIG. 4 is a chart record showing a vertical profile of the concentrations of hydrocarbons and directions and magnitude of water currents.

Referring now to FIG. 4, there is shown a vertical current profile and a vertical profile of the total hydrocarbon content, the methane content, and the ethane content of the dry gas separated from the water. More particularly, there is shown a vertical current profile 60 wherein the speed of the current meausrement above the bottom is shown to the left. The direction of the current flow at particular depths is shown by the small arrows. To the left of the current profile is shown the total hydrocarbon content 62, methane content at 63 and the ethane content at 64. Total hydrocarbon content is given in ampere $\times 10^{-11}$ with the actual values being indicated by the lower set of numerals 65, while the methane and ethane is measured in ampere $\times 10^{-11}$ with the actual values at peak heights being given at the number 66. From the above data shown in FIG. 4, it is readily appreciated that the hydrocarbon content of the dissolved gases varies materially with the depth at which the sample is taken. Thus, it is evident that the samples must be taken within a selected distance from the bottom, if the measurements are to be meaningful and used in determining the possibility of hydrocarbon seepage from formations located below the bottom.

Figure 5:
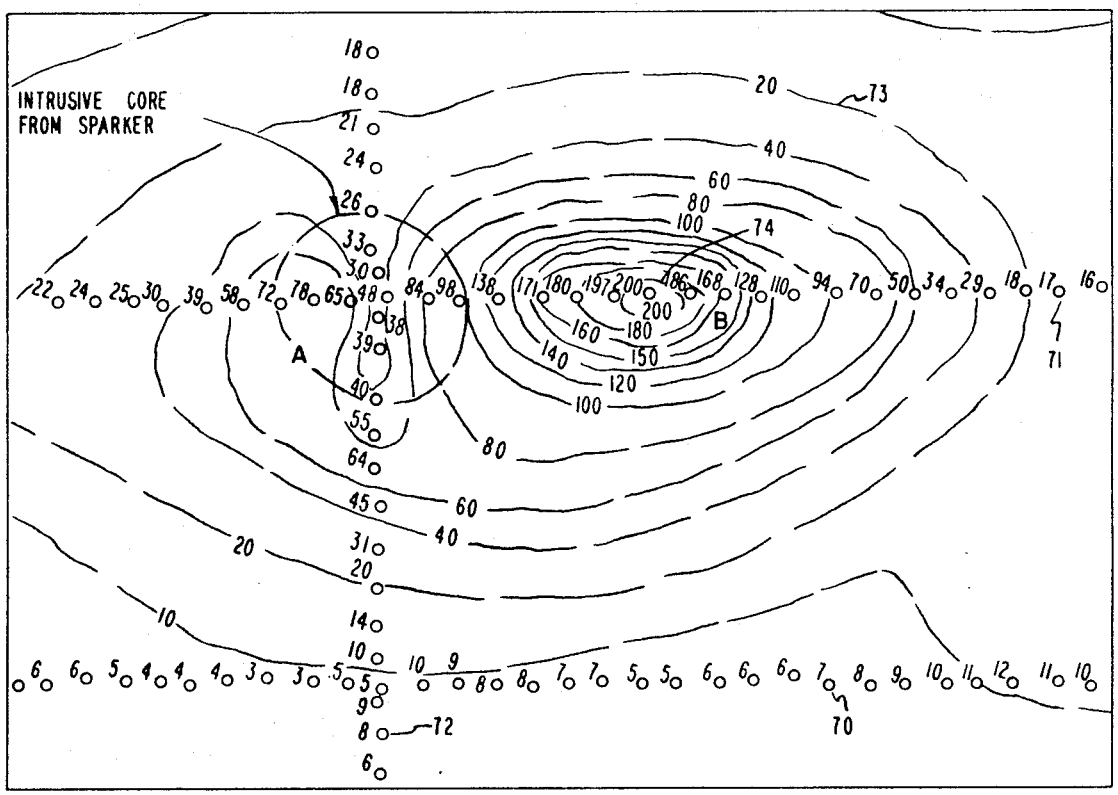
FIG. 5 is a map of the ethane content of an area.
Figure 7:
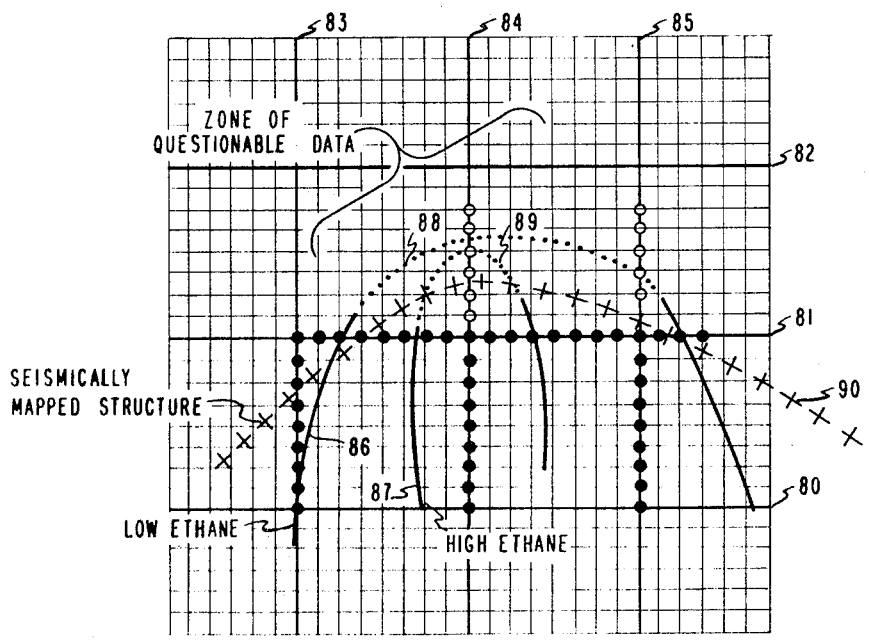
FIG. 7 is a map of the ethane content of water samples, the validity of the measurements, and subterranean structural information concerning a water-covered area of land.

Referring now to FIG. 5, there is shown the ethane map for the area referred to in FIG. 4. More particularly, there is shown the actual values of the peak ethane height in the samples obtained along survey lines 70, 71 and 72. The actual locations at which the samples are taken are shown and the value of the peaks heights are noted beside the points. The values of equal magnitude are connected by a continuous closed series of lines 73 with the actual measured values being shown along a continuous line. From this survey map it is seen that a relatively large concentration of ethane occurred at a position 74 which would indicate a possible hydrocarbon seep from a formation located below the bottom of the water-covered area.

Figure 6:
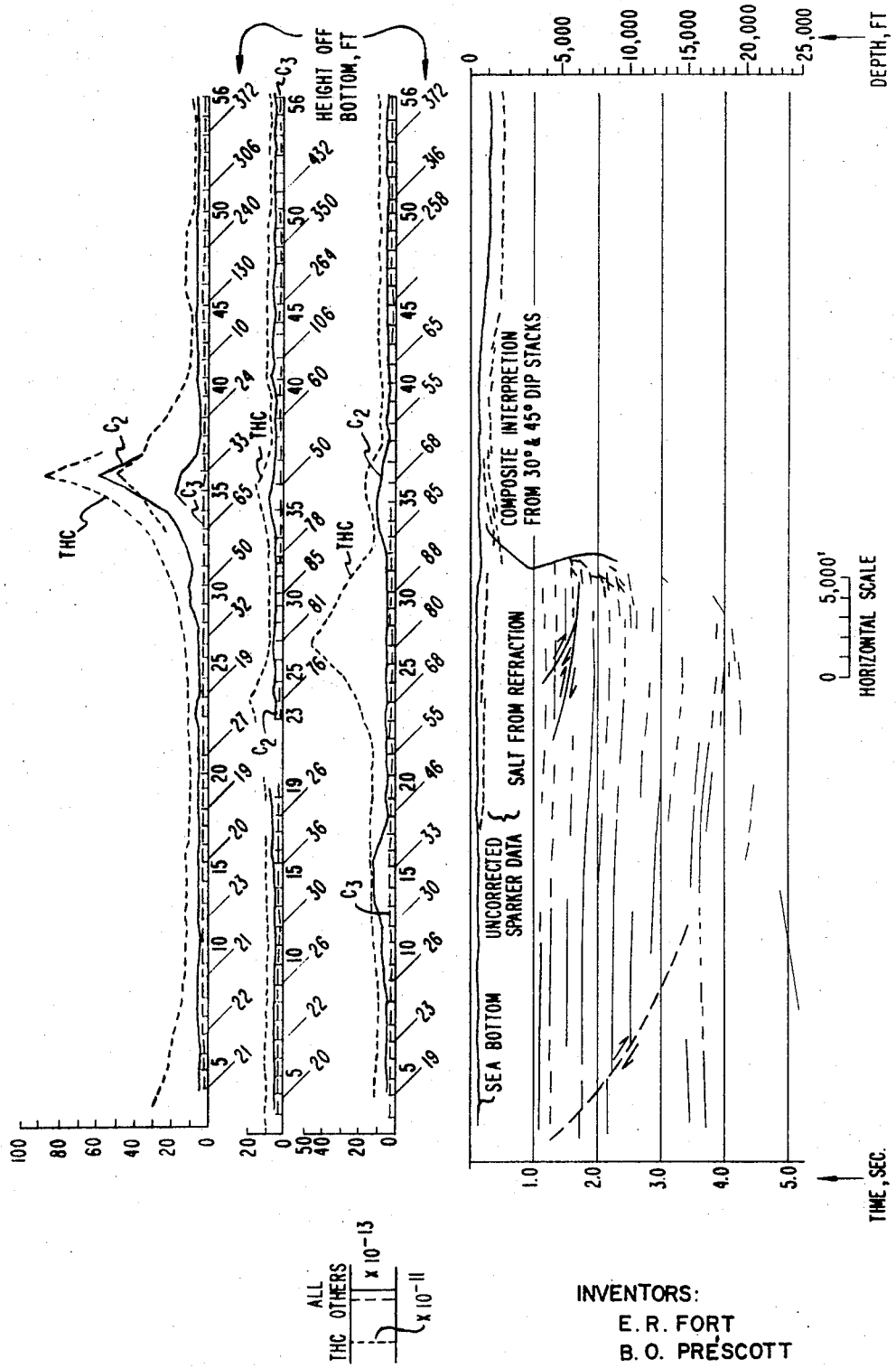
FIG. 6 is a composite chart of the hydrocarbon content in relation to the geological structure underlying the ocean floor.

Referring now to FIG. 6, there is shown a vertical composite cross section of both the geological formations that underlie the bottom of the water-covered area as well as a cross section of the hydrocarbon content obtained along the various survey lines plotted in FIG. 5. From FIG. 6 it is seen that the ethane maximum clearly occurs adjacent the top of the salt dome, indicating a strong possibility that the ethane measurements are the result of a hydrocarbon leak from a trap along the face of the salt dome.

FIG. 6 contains three vertically separated plots of the data obtained by three surveys in the same area. In the top-plotted survey, the sampling vehicle was kept relatively near the bottom, at distances off bottom averaging less than 45 feet. In the others, such distances were relatively large, averaging about 68 and 74 feet off bottom. In the top-plotted survey, the ethane concentration (between stations 30 and 40) increased to more than about 50 of th plotted units. In the others it remained below about 10. This shows that most of the hydrocarbons that entered the water remained near the bottom and would have remained undetected by a system that sampled near the surface of the water, which had a depth of more than 400 feet. If the measuring system had not been responsive to concentrations of significantly less than 10 units, neither of the lower-plotted surveys would have detected any anomaly corresponding to that found near the salt dome.

What is claimed is:

1. A process for surveying a water-covered region, comprising:
   moving a survey vessel into measured areal locations while towing a sampling vehicle at measured distances behind the survey vessel at measured distances above the bottom of the body of water;
   adjusting the depth of the sampling vehicle as required to keep it off the bottom but generally within a selected relatively short distance above the bottom;
   pumping water encountered by the sampling vehicle to the survey vessel at a measured and substantially constant rate;
   at measured intervals, measuring the concentration of at least one hydrocarbon in water pumped from the sampling vehicle; and
   indicating the areal location, distance above bottom, and hydrocarbon concentration of each of a series of portions of the water encountered by the sampling vehicle to provide a map of areas in which seepage-indicative hydrocarbon measurements have been obtained and areas in which the hydrocarbon measurements may not be representative of seepages from subterranean earth formations.

2. The process of claim 1 in which said water pumping is conducted at a measured and substantially constant rate by driving a positive displacement pump at such a rate while it displaces water into a conduit having a substantially fixed volume.

3. The process of claim 1 in which said sampling vehicle is towed at measured distances behind the survey vessel by suspending a negatively buoyant sampling vehicle on a faired cable extending substantially vertically below the survey vessel.

4. The process of claim 3 in which the depth of the sampling vehicle is adjusted to keep it near the bottom by lengthening and shortening said faired cable.

5. The process of claim 1 in which said sampling vehicle is towed at a measured distance behind the survey vessel at depths adjusted to keep it near the bottom by towing a finned, substantially neutrally buoyant sampling vehicle on a relatively long cable and adjusting its depth by adjusting the tilt of its fins.

6. The process of claim 1 in which geophysical properties of subterranean formations are measured from the positions occupied by said survey vessel and measurements are made of the spatial interrelationship between the geophysical properties and the hydrocarbon content of the water.

* * * * *

UNITED STATES PATENT OFFICE
CERTIFICATE OF CORRECTION

Patent No. 3,747,405　　　　　　　Dated July 24, 1973

Inventor(s) ELDON R. FORT, BASIL O. PRESCOTT, ARLEY WALTERS.

It is certified that error appears in the above-identified patent and that said Letters Patent are hereby corrected as shown below:

The designation of inventors should include

HAROLD L. WISE, also of Houston, Texas.

Signed and sealed this 20th day of November 1973.

(SEAL)
Attest:

EDWARD M. FLETCHER, JR.　　　　　RENE D. TEGTMEYER
Attesting Officer　　　　　　　　　Acting Commissioner of Patents